United States Patent
Du et al.

(10) Patent No.: US 8,681,669 B2
(45) Date of Patent: Mar. 25, 2014

(54) DUAL MODE BASE STATION

(75) Inventors: Jinhui Du, Beijing (CN); Jie Mao, Beijing (CN); Bin Xu, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 217 days.

(21) Appl. No.: 13/127,587

(22) PCT Filed: Nov. 5, 2008

(86) PCT No.: PCT/CN2008/001843
§ 371 (c)(1),
(2), (4) Date: Jul. 26, 2011

(87) PCT Pub. No.: WO2010/051653
PCT Pub. Date: May 14, 2010

(65) Prior Publication Data
US 2011/0274014 A1     Nov. 10, 2011

(51) Int. Cl.
*H04L 5/14* (2006.01)
(52) U.S. Cl.
USPC ............ 370/295; 370/294; 370/315; 370/492
(58) Field of Classification Search
USPC ......... 370/273–297, 315, 343, 345, 492, 501; 178/70; 330/61; 333/4; 375/211; 379/338; 455/7, 23, 73
See application file for complete search history.

(56) References Cited

U.S. PATENT DOCUMENTS

| 5,881,369 A | 3/1999 | Dean et al. |
| 6,130,897 A | 10/2000 | Ishida et al. |
| 8,126,472 B2 | 2/2012 | Lee et al. |
| 2006/0176973 A1* | 8/2006 | Alamouti et al. ............. 375/267 |
| 2007/0021080 A1* | 1/2007 | Kuriyama et al. ............ 455/132 |
| 2007/0147273 A1* | 6/2007 | Lee et al. ...................... 370/280 |
| 2008/0182605 A1 | 7/2008 | Yamaoka et al. |

FOREIGN PATENT DOCUMENTS

| CN | 101193351 A | 6/2008 |
| CN | 101217719 A | 7/2008 |
| CN | 101246998 A | 8/2008 |
| JP | 2006148460 A | 6/2006 |

OTHER PUBLICATIONS

Office Action issued in corresponding Japanese application No. JP2011-533508 on Oct. 23, 2012, with English translation of the Grounds for Rejection, 6 pages.
International Preliminary Report on Patentability issued on May 10, 2011, 4 pages.

* cited by examiner

*Primary Examiner* — Mark Rinehart
*Assistant Examiner* — Mang Yeung
(74) *Attorney, Agent, or Firm* — Rothwell, Figg, Ernst & Manbeck, P.C.

(57) ABSTRACT

The present application pertains to a dual mode radio base station that is operable to operate in either a TDD mode of operation or an FDD mode of operation. The dual mode base station may include a base-band unit (BU) and a radio unit (RU). The base-band unit may include (1) a first set of components each of which is configured to provide functionally while (a) the dual mode base station is operating in the FDD mode of operation and (b) the dual mode base station is operating in the TDD mode of operation; and (2) a second set of components each of which is configured to provide functionally (a) only while the dual mode base station is operating in the FDD mode of operation or (b) only while the dual mode base station is operating in the TDD mode of operation.

20 Claims, 4 Drawing Sheets

DUAL MODE BASE STATION

CROSS-REFERENCE TO RELATED APPLICATION

This application is a 35 U.S.C. §371 National Phase Entry Application from PCT/CN2008/001843, filed Nov 5, 2008, and designating the United States.

TECHNICAL FIELD

The present invention relates to radio base stations.

BACKGROUND

Long Term Evolution (LTE) is the name given to the latest standardization work by the 3rd generation partnership project (3GPP). LTE adopts a flatten network architecture. For example, the radio access network (RAN) includes a radio base station (RBS), but not a radio network controller (RNC). An LTE RBS is also referred to as an evolved node-B (eNB), which is a key component of the LTE RAN.

LTE support two modes of operation: (1) Frequency Division Duplex (FDD) and Time Division Duplex (TDD), for the configuration on paired and unpaired frequency bands. For these two modes, the basic differences are located in the physical layer (e.g., physical layer frame structure). In 3GPP, FDD uses frame structure type-1 (FS1); TDD works in frame structure type-2 (FS2). However, the layers above the physical layer (e.g., media access control (MAC) layer and higher layers) are the same for both FDD and TDD. That is, most (e.g., over 90%) of the signaling is similar between the two modes of operation.

For these two types of frame structures, the basic difference is that FS2 has a special sub-frame 1 ms out of 5 ms or 10 ms in periodic. In principle, this special sub-frame is inherited from TD-SCDMA frame structure. Three special time slots (DwPTS, GP, UpPTS) locate in the special sub-frame of 1 ms, used for cell search and radio access and so on.

Even if, FDD will be the main mode of operation in most systems, the TDD mode of operation will also be highly regarded by some key network operators. As mentioned above, the eNB is the kernel of the LTE RAN. From the standard compatibility and network entity integration point of view, both the FDD and TDD modes of operation are expected to be implemented in one node. But there are some hard problems that need to be solved with respect to including both FDD necessary components and TDD necessary components into one eNB cabinet.

SUMMARY

Aspects of the present invention provide a solution for implementing FDD and TDD modes of operation in one eNB. In one aspect, the invention provides a dual mode eNB. In some embodiments, the dual mode radio base station is configured to support an FDD mode of operation and a TDD mode of operation. The dual mode base station may include a base-band unit (BU) and a radio unit (RU). The base-band unit may include: (1) a first set of components each of which is configured to provide functionally while (a) the dual mode base station is operating in the FDD mode of operation and (b) the dual mode base station is operating in the TDD mode of operation; and (2) a second set of components each of which is configured to provide functionally (a) only while the dual mode base station is operating in the FDD mode of operation or (b) only while the dual mode base station is operating in the TDD mode of operation. The radio unit may include: (1) a third set of components each of which is configured to provide functionally while (a) the dual mode base station is operating in the FDD mode of operation and (b) the dual mode base station is operating in the TDD mode of operation; and (2) a fourth set of components each of which is configured to provide functionally (a) only while the dual mode base station is operating in the FDD mode of operation or (b) only while the dual mode base station is operating in the TDD mode of operation. Preferably, when the dual mode eNB is configured to operate in a certain mode, then both the BU and RU area also configured to operate in that same certain mode, so that the BU and RU are aligned.

In some embodiments, the first set of components includes a power unit configured to provide power (a) while the dual mode base station is operating in the FDD mode of operation and (b) while the dual mode base station is operating in the TDD mode of operation. In some embodiments, the first set of components also includes a processing unit configured to process media access control data and/or radio link control data (a) while the dual mode base station is operating in the FDD mode of operation and (b) while the dual mode base station is operating in the TDD mode of operation. In still other embodiments, the first set of components also includes an amplifier configured to be used to amplify a signal (a) while the dual mode base station is operating in the FDD mode of operation and (b) while the dual mode base station is operating in the TDD mode of operation, a digital signal processor configured to process a control channel (a) while the dual mode base station is operating in the FDD mode of operation and (b) while the dual mode base station is operating in the TDD mode of operation, and a transmission unit configured to be used to convert a baseband signal to a radio frequency signal (a) while the dual mode base station is operating in the FDD mode of operation and (b) while the dual mode base station is operating in the TDD mode of operation.

In some embodiments, the second set of components comprises a digital signal processor that is configured to be used only while the dual mode base station is operating in the TDD mode of operation. This digital signal processor may be configured to process a certain predetermined sub-frame (e.g. the special sub-frame in the FS2 defined in the 3GPP) of a frame structure that is applicable only in the TDD mode of operation. In some embodiments, the second set of components also includes a timing source (e.g., a GPS time source) that is configured to be used only while the dual mode base station is operating in the TDD mode of operation.

In some embodiments, the fourth set of components includes a transceiver switch that is configured to be used only while the dual mode base station is operating in the TDD mode of operation.

In another aspect, the invention provides a method of operating a dual mode radio base station that is configured to support a frequency division duplex (FDD) mode of operation and a time division duplex (TDD) mode of operation, and the dual mode radio base station comprises: (A) a base-band unit comprising (1) a first set of components and (2) a second set of components and (B) a radio unit comprising (1) a third set of components and (2) a fourth set of components. In some embodiments, the method includes the following steps: using the first and third set of components while the dual mode base station is operating in the FDD mode of operation; using the first and third set of components while the dual mode base station is operating in the TDD mode of operation; and using the second and fourth set of components only while the dual mode base station is operating in the TDD mode of operation.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
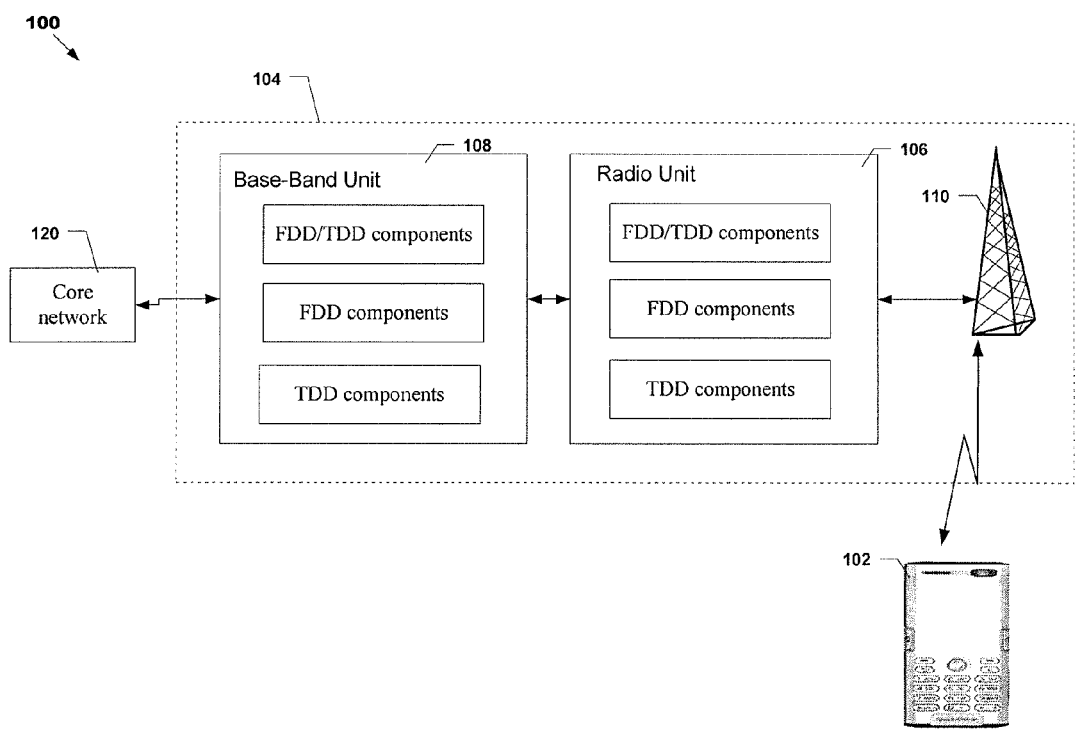
FIG. 1 is a functional block diagram of a portion of a network according to an embodiment of the invention.

Referring now to FIG. 1, FIG. 1 illustrates a portion of a communications network 100. As illustrated, network 100 includes a mobile terminal 102 (a.k.a., "user equipment (UE)") in communication with a base station 104 (e.g., eNB), which is interfaced with a core network 120. Aspects of the present invention provide a solution for implementing FDD and TDD modes of operation in eNB 104. That is, eNB 104 is a dual mode base station configured to support an FDD mode of operation and a TDD mode of operation.

Typically, the hardware of eNB 104 includes a base-band unit (BU) 108 and a radio unit (RU) 106. These two units may be integrated in one physical cabinet. When the RU is located remotely from BU, the RU is sometimes referred to as a remote RU (RRU).

Generally, BU 108 is composed of processor units, such as digital signal processors (DSPs) for processing baseband signals, processing units (e.g., PowerPC) for the processing of MAC and above layer in the air-interface protocol stack, a timing unit, a radio unit interface (RUIF), a main processor, etc. Generally, RU 106 is composed of a transmitter/receiver (TRx) board, a filter unit (FU), a power amplifier (PA), etc.

Amongst the above mentioned components of BU 108 and RU 106, most are the same for both the FDD and TDD modes of operation. Accordingly, in some embodiments, BU 108 includes: (1) a set of components, each of which is configured to provide functionally (a) while the dual mode base station is operating in the FDD mode of operation and (b) while the dual mode base station is operating in the TDD mode of operation; and (2) a set of components, each of which is configured to provide functionally (a) only while the dual mode base station is operating in the FDD mode of operation or (b) only while the dual mode base station is operating in the TDD mode of operation. Similarly, RU 106 includes: (1) a set of components, each of which is configured to provide functionally (a) while the dual mode base station is operating in the FDD mode of operation and (b) while the dual mode base station is operating in the TDD mode of operation; and (2) a set of components, each of which is configured to provide functionally (a) only while the dual mode base station is operating in the FDD mode of operation or (b) only while the dual mode base station is operating in the TDD mode of operation.

This feature is illustrates in FIG. 1, which shows BU 108 having a set of FDD components (i.e., components that are used only when base station 104 is operating in the FDD mode of operation), a set of TDD components (i.e., components that are used only when base station 104 is operating in the TDD mode of operation), and a set of FDD/TDD components (i.e., components used while base station 104 is the FDD mode and in the TDD mode). Similarly, FIG. 1 shows RU 106 having a set of FDD components, a set of TDD components, and a set of FDD/TDD components.

Figure 2:
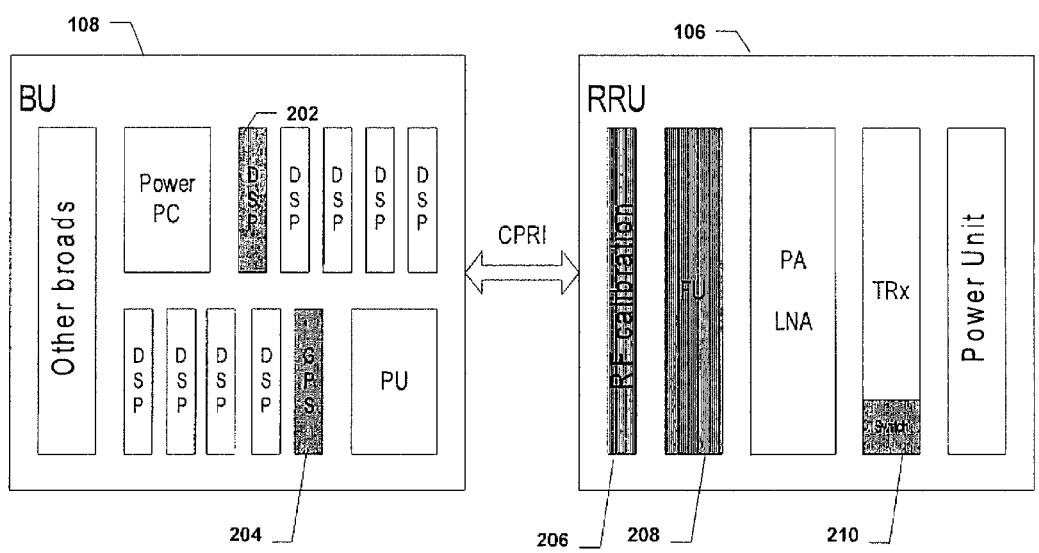
FIG. 2 is a functional block diagram of a portion of a base station according to an embodiment of the invention.

Referring now to FIG. 2, FIG. 2 further illustrates BU 108 and RU 106 according to one embodiment of the invention. As shown in FIG. 2, BU 108 may include a DSP, a timing circuit 204 (e.g., a circuit for receiving global positioning system (GPS) signals), a power unit (PU), a processing unit (e.g., a PowerPC processing unit), as well as other components. Similarly, RU 106 may include: radio frequency (RF) calibration components, a filter unit (FU), a power amplifier (PA) and a low noise amplifier (LNA), a transmitter/receiver (TRx) unit, a switch, and a power unit (PU).

As discussed above, some of the components of BU 108 are used only when base station 104 is the FDD mode of operation, some of the components of BU 108 are used only when base station 104 is the TDD mode of operation, and some of the components of BU 108 are used in both modes of operation. For example, because the TDD mode requires more precise timing alignment among eNBs to avoid inter-eNB synchronization, which is fatal for TDD systems, in particular at the UL/DL switching points, timing component 204 (e.g., a GPS card) is required for TDD mode, but is just optional for FDD mode. Additionally, as above mentioned, the basic diversity of FDD and TDD in frame structure is the special sub-frame. Therefore, DSP 202 may be dedicated to process the special sub-frame. That is, DSP 202 is only needed for the TDD mode of operation. Components of BU 108 that can be shared between the FDD mode and the TDD mode include, for example: the PU, which provides power for the components; DSPs for data processing in physical traffic and control channels; PowerPC, used for process of MAC, RLC and above layers, signaling, etc; and other boards, for example, the interface among units in BU 108, the interface to RU 106, system timing distribute unit, etc.

Likewise, as discussed above, some of the components of RU 106 are used only when base station 104 is the FDD mode of operation, some of the components of RU 106 are used only when base station 104 is the TDD mode of operation, and some of the components of RU 106 are used in both modes of operation. For example, the shaded components in FIG. 2 (i.e., components 206, 208 and 210) are components that may be required in one mode of operation, but not required in the other mode. Components of RU 108 that can be shared between the FDD mode and the TDD mode include, for example: TRx, used for transform between baseband signal and radio frequency signal of transmission and reception; and PA and LNA.

Based on the above, a two mode eNB has FDD and TDD components installed together. The two mode eNB includes both reusable units and separate units. For the reusable units, they work under both FDD and TDD configuration. For the separate units, only the corresponding units are enabled under FDD or TDD configuration.

Figure 3:
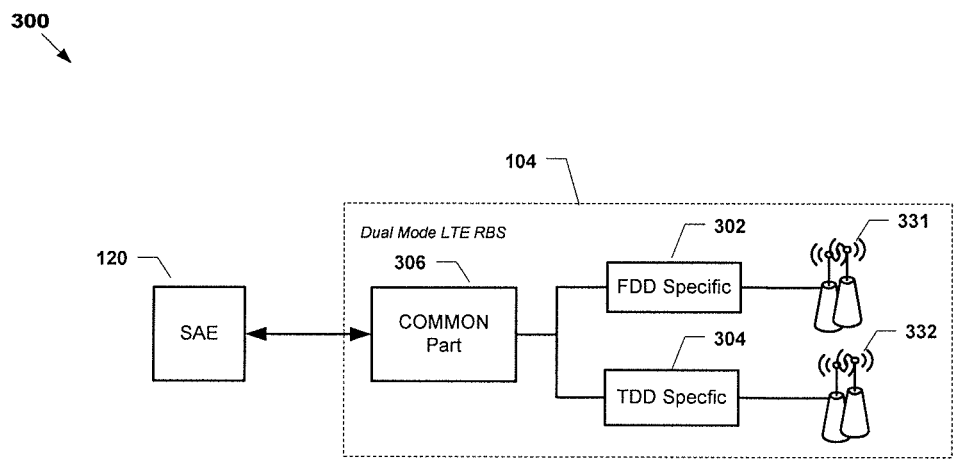
FIG. 3 is a functional block diagram of a base station according to other embodiments.

If required pre-conditions are satisfied (e.g., the operator has both FDD and TDD license), the two mode eNB can support FDD and TDD modes at the same time, called "bi-mode". The reusable units are sufficient for operation under FDD and TDD at the same time, but there are separate radio channel and antenna elements for FDD and TDD. This is illustrated in FIG. 3, which shows eNB 104 in a bi-mode of operation. As shown in FIG. 3, eNB 104 may include two antenna elements 331 and 332 or antenna groups in which multi antenna elements per group for the FDD mode and TDD mode, respectively. Coupled to antenna element/group 331 are FDD only components 302 and coupled to antenna element/group 332 are TDD only components 304. However, because baseband processing and higher is similar, FDD components 302 and TDD components 304 are both coupled to the common components 306.

The two mode eNB 104 can work under FDD/TDD/B-modes and switch between the modes by means of Operation & Maintenance (O&M) operators during cell setup. The two mode eNB 104 should be as the same role as a functional entity in the network architecture when under FDD/TDD/Bi-mode, for example as shown in FIG. 3 the two mode eNB 104 should be linked to System Architecture Evolution (SAE) based Evolved Packet core System (EPS) and site materials like cable and antenna elements.

Network Planning and Optimization

For different application requirements, the dimensioning of eNB 104 could be for: (1) Macro cell in integrated device or BU+RU structure, (2) Micro cells by using a super eNB with powerful data process capability, (3) indoor cell by repeater or relay, and (4) for Femto cell. Normally, FDD and TDD mode work separately. But In theory when two mode work at the same time, some services can be support by only FDD mode and others supported by only TDD mode (e.g. the applications which requires unsymmetrical and/or various transmission bandwidth in UL and DL). It provides a possibility to match service symmetry by using the corresponding duplex mode. FDD suits for symmetry services and TDD under different UL and DL slot direction setting can suit for un-symmetry services. The two mode LTE RBS can serve for one more operators. (eNB share mode). Also, the two mode LTE RBS can link to the same or different site materials, for example cables and antenna elements.

Figure 4:
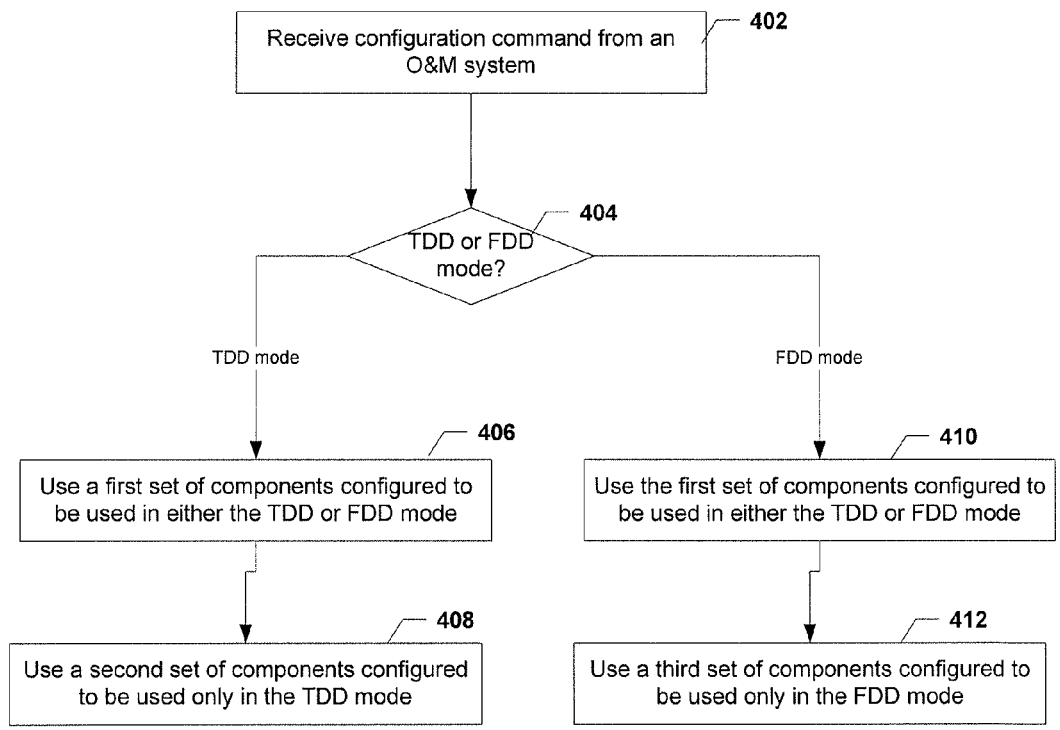
FIG. 4 is a flow chart illustrating a process according to some embodiments of the invention.

Referring now to FIG. 4, FIG. 4 illustrates a process according to an embodiment of the invention. The process may begin in step 402, where eNB 104 receives a configuration command. For example, eNB 104 may receive the configuration command from an operation & maintenance (O&M) system. In step 404, based on the configuration command, eNB 104 determines whether it should operate in the TDD mode or the FDD mode. In other embodiments, eNB 104 determines whether it should operate in the TDD mode, the FDD mode or the bi-mode. If eNB 104 determines that it should operate in the TDD mode, then eNB 104 uses a first set of components and a second set of components (steps 406 and 408, respectively). And if eNB 104 determines that it should operate in the FDD mode, then eNB 104 uses the first set of components and a third set of components (steps 410 and 412, respectively). The second set of components includes components not included in either the first set of components or the third set of components, and the third set of components includes components not included in either the first set of components or the second set of components.

Thus, the second set of components are the components that are configured to be used only in the TDD mode of operation and the third set of components are the components that are configured to be used only in the FDD mode of operation. In this manner, eNB 104 is configured such that some components are shared between the FDD mode and the TDD mode. This provides some advantages. For example, this may (1) decrease the eNB design, development and maintenance cost; (2) decrease the cost of research and development; (3) benefit operators by decreasing the cost of device purchasing, network planning, and optimization; and (4) benefit the site survey/installation.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A dual mode radio base station, wherein the dual mode radio base station is configured to support a frequency division duplex (FDD) mode of operation and a time division duplex (TDD) mode of operation, the dual mode radio base station comprising:
    a base-band unit comprising:
        (1) a first set of components each of which is configured to provide functionality while the dual mode radio base station is operating in both the FDD mode of operation and the TDD mode of operation at the same time; and
        (2) a second set of components each of which is configured to provide functionality:
            (a) only while the dual mode radio base station is operating in the FDD mode of operation or
            (b) only while the e dual mode radio base station is operating in the TDD mode of operation; and
    a radio unit comprising:
        (1) a third set of components each of which is configured to provide functionality while the dual mode radio base station is operating in both the FDD mode of operation and the TDD mode of operation at the same time; and
        (2) a fourth set of components each of which is configured to provide functionality:
            (a) only while the dual mode radio base station is operating in the FDD mode of operation or
            (b) only while the dual mode radio base station is operating in the TDD mode of operation.

2. The dual mode radio base station of claim 1, wherein the first set of components comprises a power unit configured to provide power (a) while the dual mode radio base station is operating in the FDD mode of operation and (b) while the dual mode radio base station is operating in the TDD mode of operation.

3. The dual mode radio base station of claim 1, wherein the first set of components comprises a processing unit configured to process media access control data and/or radio link, control data (a) while the dual mode radio base station is operating in the FDD mode of operation and (b) while the dual mode radio base station is operating in the TDD mode of operation.

4. The dual mode radio base station of claim 1, wherein the first set of components comprises an amplifier configured to be used to amplify a signal (a) while the dual. mode radio base station is operating in the FDD mode of operation and (b) while the dual mode radio base station is operating in the TDD mode of operation.

5. The dual mode radio base station of claim 1, wherein the first set of components comprises a digital signal processor configured to process a control channel (a) while the dual mode radio base station is operating in the FDI) mode of operation and (b) while the dual mode radio base station is operating in the TDI) mode of operation.

6. The dual mode radio base station of claim 1, wherein the first set of components comprises a transmission unit configured to be used to convert a baseband signal to a radio frequency signal (a) while the dual mode radio base station is operating in the FDD mode of operation and (b) while the dual mode radio base station is operating in the TDD mode of operation.

7. The dual mode radio base station of claim 1, wherein the second set of components comprises a digital signal processor that is configured to be used only while the dual mode radio base station is operating in the TDD mode of operation.

8. The dual mode radio base station of claim 7, wherein the digital signal processor that is configured to be used only while the dual mode radio base station is operating in the TDD mode of operation is configured to process a certain predetermined sub-frame of a frame structure that is applicable only in the TDD mode of operation.

9. The dual mode radio base station of claim 1, wherein the second set of components comprises a global positioning system (GPS) timing source that is configured to be used only while the dual mode radio base station is operating in the TDD mode of operation.

10. The dual mode radio base station of claim 1, wherein the fourth set of components comprises a transceiver switch that is configured to be used only while the dual mode radio base station is operating in the TDD mode of operation.

11. A method of operating a dual mode radio base station, the dual mode radio base station being configured to support a frequency division duplex (FDD) mode of operation and a time division duplex (TDD) mode of operation, and the dual mode radio base station comprises: (A) a base-band unit that comprises a first set of components and a second set of components, and (B) a radio unit that comprises a third set of components and a fourth set of components, the method comprising:
using the first and third set of components while the dual mode radio base station is operating in the FDD mode of operation at the same time the dual mode radio base station is operating in the TDD mode of operation; and
using the second and fourth set of components only while the dual mode radio base station is operating in the TDD mode of operation.

12. The method of claim 11, wherein the first set of components comprises a power unit configured to provide power (a) while the dual mode radio base station is operating in the MD mode of operation and (b) while the dual mode radio base station is operating in the TDD mode of operation.

13. The method of claim 11, wherein the first set of components comprises a processing unit configured to process media access control data and/or radio link control data (a) while the dual mode radio base station is operating in the FDD mode of operation and (b) while the dual mode radio base station is operating in the TDD mode of operation.

14. The method of claim 11, wherein the first set of components comprises an amplifier configured to be used to amplify a signal (a) while the dual mode radio base station is operating in the FDD mode of operation and (b) while the dual mode radio base station is operating in the TIM) mode of operation.

15. The method of claim 11, wherein the first set of components comprises a digital signal processor configured to process a control channel (a) while the dual mode radio base station is operating in the MD mode of operation and (b) while the dual mode radio base station is operating in the TDD mode of operation.

16. The method of claim 11, wherein the first set of components comprises a transmission unit configured to be used to convert a baseband signal to a radio frequency signal (a) while the dual mode radio base station is operating in the FDD mode of operation and (b) while the dual mode radio base station is operating in the TDD mode of operation.

17. The dual mode radio base station of claim 11, wherein the second set of components comprises a digital signal processor that is configured to be used only while the dual mode radio base station is operating in the TDD mode of operation.

18. The dual mode radio base station of claim 17, wherein the digital signal processor that is configured to be used only while the dual mode radio base station is operating in the TDD mode of operation is configured to process a certain predetermined sub-frame of a frame structure that is applicable only in the TDD mode of operation.

19. The dual mode radio base station of claim 11, wherein the second set of components comprises a timing source that is configured to be used only while the dual mode radio base station is operating in the TDD mode of operation.

20. The dual mode radio base station of claim 11, wherein the fourth set of components comprises a transceiver switch that is configured to be used only while the dual mode radio base station is operating in the TDD mode of operation.

* * * * *

UNITED STATES PATENT AND TRADEMARK OFFICE
CERTIFICATE OF CORRECTION

Page 1 of 1

PATENT NO. : 8,681,669 B2
APPLICATION NO. : 13/127587
DATED : March 25, 2014
INVENTOR(S) : Du et al.

It is certified that error appears in the above-identified patent and that said Letters Patent is hereby corrected as shown below:

In the Specification

In Column 4, Line 51, delete "RU 108" and insert -- RU 106 --, therefor.

In the Claims

In Column 6, Line 31, in Claim 1, delete "e dual" and insert -- dual --, therefor.

In Column 6, Line 53, in Claim 3, delete "link," and insert -- link --, therefor.

In Column 6, Line 60, in Claim 4, delete "dual. mode" and insert -- dual mode --, therefor.

In Column 6, Line 67, in Claim 5, delete "FDI)" and insert -- FDD --, therefor.

In Column 7, Line 2, in Claim 5, delete "TDI)" and insert -- TDD --, therefor.

In Column 8, Line 2, in Claim 12, delete "MD" and insert -- FDD --, therefor.

In Column 8, Line 14, in Claim 14, delete "TIM)" and insert -- TDD --, therefor.

In Column 8, Line 19, in Claim 15, delete "MD" and insert -- FDD --, therefor.

Signed and Sealed this
Fourth Day of August, 2015

Michelle K. Lee
*Director of the United States Patent and Trademark Office*